(12) United States Patent
Truscott

(10) Patent No.: US 9,694,530 B2
(45) Date of Patent: Jul. 4, 2017

(54) EXTRUSION DIE TENSION ADJUSTER AND METHOD OF USING SAME

(71) Applicant: Nordson Corporation, Westlake, OH (US)

(72) Inventor: Michael K. Truscott, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 170 days.

(21) Appl. No.: 14/660,386

(22) Filed: Mar. 17, 2015

(65) Prior Publication Data

US 2016/0271855 A1  Sep. 22, 2016

(51) Int. Cl.
| | |
|---|---|
| B29C 47/16 | (2006.01) |
| B29C 47/00 | (2006.01) |
| B29C 47/08 | (2006.01) |
| B29C 47/92 | (2006.01) |
| B23P 15/24 | (2006.01) |

(52) U.S. Cl.
CPC ............ *B29C 47/165* (2013.01); *B23P 15/24* (2013.01); *B29C 47/0021* (2013.01); *B29C 47/0828* (2013.01); *B29C 47/92* (2013.01); *B29C 2947/92133* (2013.01); *B29C 2947/92447* (2013.01); *B29C 2947/92523* (2013.01)

(58) Field of Classification Search
CPC ..... B29C 47/165; B29C 47/0828; B23P 15/24
IPC ...................................................... B23P 15/24
See application file for complete search history.

(56) References Cited

U.S. PATENT DOCUMENTS

| | | | |
|---|---|---|---|
| 2,963,741 A | 12/1960 | Longstreth et al. | |
| 3,382,537 A | 5/1968 | Tigner | |
| 3,813,204 A | 5/1974 | Gregory | |

(Continued)

FOREIGN PATENT DOCUMENTS

| | | |
|---|---|---|
| EP | 2979840 A2 | 2/2016 |
| JP | H0494423 U | 8/1992 |

(Continued)

OTHER PUBLICATIONS

Unpublished U.S. Appl. No. 14/627,489 entitled "System and Method for Adjusting the Land Channel Length on an Extrusion Die", filed Feb. 20, 2015, 32 pages.

(Continued)

*Primary Examiner* — Joseph S Del Sole
*Assistant Examiner* — Cedrick Williams
(74) *Attorney, Agent, or Firm* — Baker & Hostetler LLP

(57) ABSTRACT

An extrusion die with fastener tension adjustment assembly can be formed of a die body that includes a first die body portion and a second die body portion. The extrusion die can have a lip body connected to one of the die body portions using the plurality of fasteners. In one configuration, the fastener tension adjustment assembly has an elongated body operatively connected to each of said plurality of fasteners. The fastener tension adjustment assembly is movable towards and away from the lip body, thereby simultaneously adjusting an amount of force applied to each of said plurality of fasteners. Because the fastener tension adjustment assembly can simultaneously adjust the amount of force on each of the plurality of fasteners, it can eliminate time consuming fastener-by-fastener adjustments on the extrusion die.

24 Claims, 8 Drawing Sheets

(56) References Cited

U.S. PATENT DOCUMENTS

| | | | |
|---|---|---|---|
| 3,829,274 | A | 8/1974 | Melead |
| 4,753,587 | A | 6/1988 | Djordjevic et al. |
| 4,990,079 | A | 2/1991 | Lorenz |
| 5,639,305 | A | 6/1997 | Brown et al. |
| 6,287,105 | B1 * | 9/2001 | Druschel .............. B29C 47/165 425/190 |
| 7,296,991 | B2 | 11/2007 | Irwin |
| 8,702,414 | B1 * | 4/2014 | Pitsch .................... B29C 47/16 425/150 |
| 8,777,605 | B2 | 7/2014 | Ulcej et al. |
| 8,858,211 | B2 | 10/2014 | Fraley |
| 9,302,420 | B1 * | 4/2016 | Darrow .............. B29C 47/0828 |
| 2013/0122131 | A1 | 5/2013 | Sedivy et al. |

FOREIGN PATENT DOCUMENTS

| | | |
|---|---|---|
| JP | H08112852 A | 5/1996 |
| WO | 9727990 A1 | 8/1997 |

OTHER PUBLICATIONS

European Application No. 16160677.7: Extended Search report dated Jul. 22, 2016, 5 pages.

\* cited by examiner

EXTRUSION DIE TENSION ADJUSTER AND METHOD OF USING SAME

TECHNICAL FIELD

This disclosure relates to extrusion dies and, more particularly, to systems and methods for adjusting the tension of extrusion die fasteners.

BACKGROUND

An extrusion die is used to extrude molten thermoplastic material into a relatively thin film or sheet. Typical extrusion dies have a flow channel formed between a pair of die bodies and a pair of die lips. The die lips are positioned on the downstream end of the die bodies to form an outlet or exit orifice of the flow channel. In operation, molten polymer flows through the flow channel from an inlet opening provided on the upstream end between the pair of die bodies to the outlet orifice provided on the downstream end between the die lips. For example, a conventional coat hanger die has an inlet, an inlet manifold, a generally triangular or "coat hanger"-shaped preland channel, a final land channel, and a die exit formed between a pair of die lips.

In practice, sheet manufacturers are often required to produce sheets of different thicknesses to meet various customer demands. For this reason, an extrusion die can have adjustable lip gap spacing. The distance between the lips of the extrusion die can be adjusted by the manufacturer to control the size of the die exit. In turn, this controls the thickness of the sheet exiting the die.

To allow the spacing between the die lips to be adjusted, the die lips may be formed of separate structures from the die bodies that are then attached to the die bodies. For example, in some configurations, the die lips are bolted to the die bodies with multiple bolts positioned at spaced intervals along the length of the die bodies. In use, an operator may be required to loosen all of the bolts holding the die lip to the die body, move the die lip relative to the die body, and then retighten all the bolts. To ensure that molten polymer does not leak through the gap between the die lip and the die body, the operator is usually required to torque each bolt holding the die lip to the die body down with a specific amount of force. This process of loosening the bolts, adjusting the die lip, and carefully retightening the bolts can be time consuming, necessitating several hours of downtime to adjust the die lips.

SUMMARY

In general, this disclosure is directed to systems and methods for adjusting the tension of extrusion die fasteners. In one configuration, an extrusion die is described that includes a tension adjustment assembly configured to adjust the tension on bolts holding a lip body to a die body portion. The lip body is connected on the downstream end of the die body portion in the direction of polymer flow using a plurality of bolts. The bolts are positioned at equally spaced intervals along the length of the lip body and die body portion. The tension adjustment assembly includes an elongated body operatively connected to each of the plurality of bolts. The tension adjustment assembly applies a biasing force to each of the bolts and is movable towards and away from the lip body to adjust the amount of force applied to the bolts. For example, the tension adjustment assembly can press against the heads of the bolts while the shafts of the bolts extend through the lip body and into the die body portion. Moving the tension adjustment assembly away from the lip body causes the tension adjustment assembly to press against the heads of the bolts with greater force, increasing the torque on the bolts. Conversely, moving the tension adjustment assembly toward the lip body causes the tension adjustment assembly to press against the heads of the bolts with less force, decreasing the torque on the bolts.

While the specific configuration of the tension adjustment assembly can vary as described herein, in one application, the tension adjustment assembly is formed of a slide bar having a plurality of grooves into which a corresponding plurality of ball bearings are inserted. The number of grooves and ball bearings corresponds to the number of bolts holding the lip body to the die body portion, e.g., such that one groove and ball bearing is positioned between the head of each bolt and the lip body. Each groove formed into the slide bar has an angled bottom surface such that the groove is deeper on one end and shallower on an opposite end. In operation, the slide bar can slide laterally (e.g., in a direction parallel to the length of the extrusion die), causing the ball bearings to translate in the grooves from a shallower end to a deeper end, or vice versa depending on the direction of translation. As the ball bearings slide from the deeper end to the shallower end of the groove, the ball bearings push the slide bar away from the lip body, causing the tension adjustment assembly to apply a greater amount of force to the bolts. Moving in the opposite direction, the ball bearings slide from the shallower end to the deeper end of the groove, causing the tension adjustment assembly to apply a lesser amount of force to the bolts.

By providing a tension adjustment assembly operatively connected to the plurality of bolts holding the lip body to the die body portion, the amount of force applied by the tension adjustment assembly to each bolt can be simultaneously adjusted. For example, making a single adjustment to the tension adjustment assembly, for example to move the slide bar one direction or the other, can simultaneously adjust the amount of force applied on each bolt holding the lip body to the die body portion. This can allow an operator to make quick adjustments to the extrusion die, eliminating the bolt-by-bolt adjustment process that would otherwise be required.

While the tension adjustment assembly can simultaneously adjust the amount of force applied to each of the bolts holding the lip body to the die body portion, in practice, an operator may initially tighten each bolt individually using a bolt-by-bolt tightening process. For example, the operator may insert each bolt through the lip body and into the die body portion, securing each bolt with a threshold amount of force. After inserting all the bolts and tightening the bolts to the threshold amount of force (which may be the same for each bolt), the operator can engage the tension adjustment assembly to simultaneously increase the amount of force by which each bolt holds the lip body to the die body portion. During subsequent operation, the operator can engage the tension adjustment assembly to simultaneously reduce the amount of force by which each bolt holds the lip body to the die body portion, reducing the force to a point where the lip body can be moved relative to the die body portion. After moving the lip body to a desired position relative to the die body portion, the operator can again engage the tension adjustment assembly to simultaneously increase the amount of force by which each bolt holds the lip body to the die body portion.

In one example, an extrusion die is described that includes a die body, a lip body, a plurality of fasteners, a fastener tension adjustment assembly, and a flow channel terminating in an outlet orifice. The die body includes a first die body portion and a second die body portion forming the flow channel therebetween. The lip body is connected to one of the first die body portion and the second die body portion by the plurality of fasteners. The lip body forms one side of the outlet orifice. The fastener tension adjustment assembly includes an elongated body operatively connected to each of the plurality of fasteners. The fastener tension adjustment assembly is movable towards and away from the lip body, thereby simultaneously adjusting an amount of force applied to each of the plurality of fasteners.

In another example, a method of adjusting an amount of force applied to a plurality of fasteners connecting a lip body to a die body portion on an extrusion die using a fastener tension adjustment assembly is described. The method includes actuating the fastener tension adjustment assembly and thereby causing the fastener tension adjustment assembly to move away from the lip body. The method further includes, in response to the fastener tension adjustment assembly moving away from the lip body, simultaneously increasing an amount of force applied by the fastener tension adjustment assembly on each of the plurality of fasteners.

The details of one or more examples are set forth in the accompanying drawings and the description below. Other features, objects, and advantages will be apparent from the description and drawings, and from the claims.

DETAILED DESCRIPTION

This disclosure relates to an extrusion die having a fastener tension adjustment assembly and methods for adjusting the tension on extrusion die fasteners using such assembly. In one embodiment, the extrusion die has a pair of die body portions providing a polymer flow channel therethrough. The die body portions have a corresponding pair of die lips that form an outlet orifice to the polymer flow channel. At least one, and in some configurations both, of the die lips are formed by a lip body that is physically separate from and attachable to a die body portion. The lip body is connected to the die body portion using a plurality of fasteners. The fasteners are inserted through fastener openings in the lip body portion and each have a distal end that is mechanically engaged in the die body portion, thereby mechanically affixing the lip body to the die body portion. The amount of force, or torque, holding the lip body to the die body portion varies depending on how deep the distal end of the fastener is driven into the die body portion and/or how far the proximal end of the fastener is pulled away from the lip body portion. Pushing the proximal end of the fastener outwardly increases the tension on the fastener, holding the lip body to the die both portion with greater force.

To adjust the amount of force applied by each of the fasteners holding the lip body to the die body portion, the extrusion die includes a fastener tension adjustment assembly. The fastener tension adjustment assembly includes, in some configurations, an elongated body operatively connected to each of the fasteners. For example, the elongated body can extend along the length of the extrusion die and be positioned to push against the proximal end of the fasteners. The fastener tension adjustment assembly is movable to adjust the amount of force applied by the assembly to each of the fasteners and, correspondingly, the amount of force holding the lip body to the die body portion. In one embodiment, the fastener tension adjustment assembly pushes directly against the proximal ends of the fasteners. In another embodiment, the fastener tension adjustment assembly pushes against an intermediate fastener engagement member positioned between the proximal ends of the fasteners and the lip body. In either embodiment, the fastener tension adjustment assembly can move toward the lip body to decrease the amount of force applied to the fasteners or away from the lip body to increase the amount of force applied to the fasteners. Because the fastener tension adjustment assembly is operatively connected to each of the fasteners, the amount of force applied by the assembly to each of the fasteners is adjusted simultaneously (e.g., at the same time and/or rate). This can allow for quick adjustment of all of the fasteners, eliminating extended service time for fastener-by-fastener adjustments.

Figure 1:
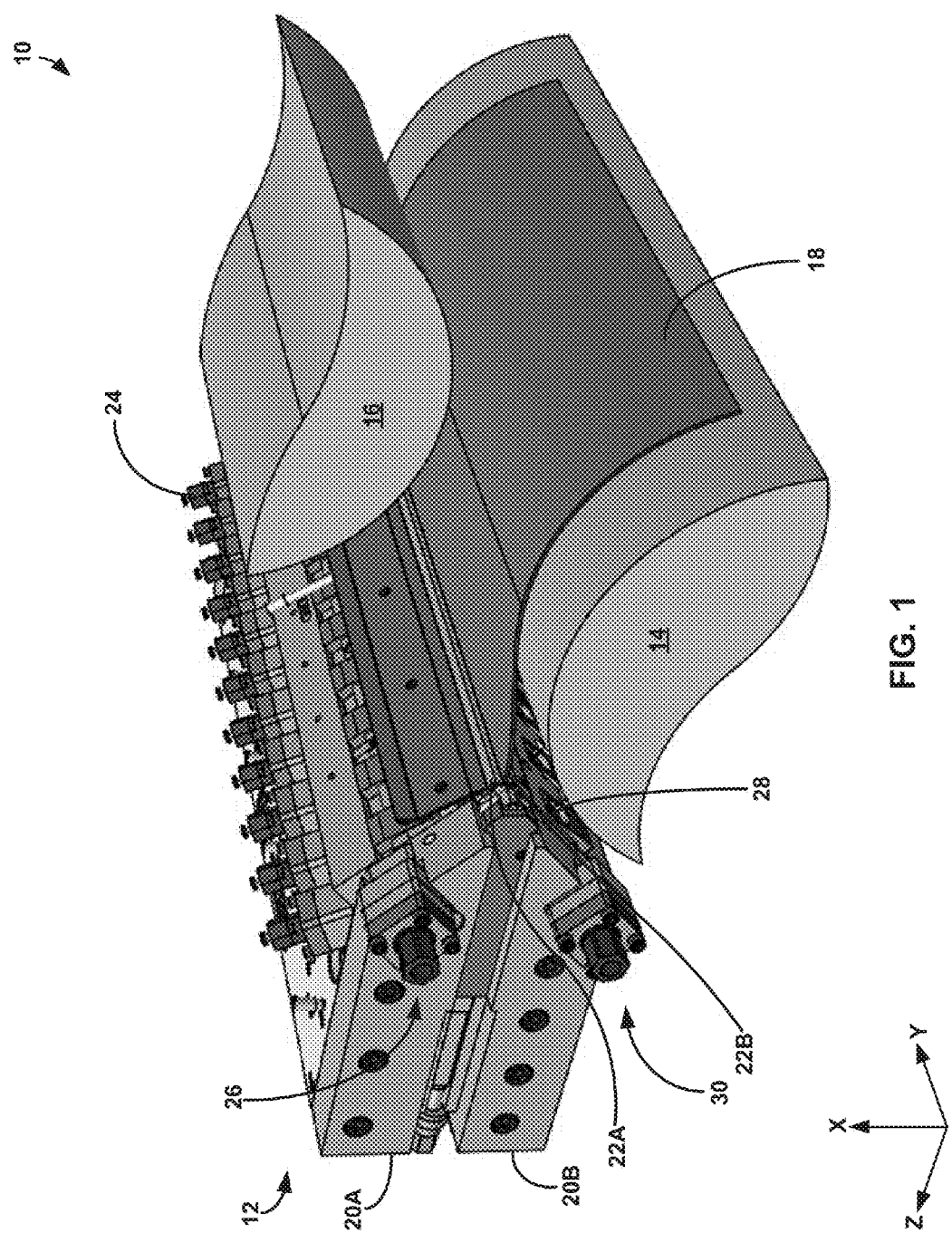
FIG. 1 is a perspective illustration of an example system, including an example extrusion die, that may be used to manufacture a thin sheet extrudate.

FIG. 1 is a perspective illustration of a system 10 that includes an extrusion die 12 and a calender formed of cooperating rollers 14 and 16. Extrusion die receives molten thermoplastic material, for example from an upstream feed block not illustrated, and extrudes the thermoplastic material into a sheet 18. Extrusion die 12 is formed of a first die body portion 20A carrying a first lip body 22A and a second die body portion 20B carrying a second lip body 22B. First die body portion 20A is connected to first lip body 22A with a plurality of fasteners 24 positioned at spaced intervals along the length of extrusion die 12 (in the Y-direction indicated on FIG. 1). As described in greater detail below, extrusion die 12 also has a fastener tension adjustment assembly 26 that is operable to adjust the tension on fasteners 24 and, correspondingly, the amount of force holding first lip body 22A to first die body portion 20A.

To extrude molten thermoplastic material, a flow channel is formed between first die body portion 20A and second die body portion 20B. The flow channel is a pathway along which molten polymer travels through the extrusion die. The flow channel extends from an inlet on the upstream side of the die (in the direction of polymer flow travel) to an outlet orifice on the downstream side of the die. Sheet 18 discharges through the outlet orifice and is calendered between cooperating rollers 14 and 16, which define a nip therebetween. In other configurations of system 10, sheet 18 can be discharged onto a single roller 14 without being calendered or may not be discharged onto a discharge roller at all.

In the illustrated configuration, extrusion die 12 includes first lip body 22A and second lip body 22B forming the outlet orifice. First lip body 22A is connectable to first die body portion 20A to provide a first die lip bounding one side of the outlet orifice of the extrusion die. Second lip body 22B is connectable to second die body portion 20B to provide a second die lip bounding an opposite side of the outlet orifice of the extrusion die. In other configurations, one of first lip body 22A and second lip body 22B can be made integral with the corresponding die body portion such that the lip body is not a physically separate structure from the die body.

In some configurations of extrusion die 12, first lip body 22A and/or second lip body 22B are movable to adjust the width of the outlet orifice. In these configurations, extrusion die 12 can include an adjustment mechanism that can be engaged to increase or decrease the width of the outlet orifice between first lip body 22A and second lip body 22B. The adjustment mechanism moves first lip body 22A and second lip body 22B in opposing directions to increase or decrease the width of the outlet orifice (the positive and negative X-direction indicated on FIG. 1). This is useful to control the thickness of the sheet produced using extrusion die 12. In other configurations, the width between first lip body 22A and second lip body 22B is fixed such that the spacing between the lips is not adjustable.

Independent of the specific configuration of extrusion die 12, the extrusion die can process any desired types of thermoplastic materials to form sheet 18. Example polymeric materials that may be extruded using extrusion die 12 include, but are not limited to, polyethylene (e.g., high-density, low-density, linear low-density), polypropylene, polyvinyl chloride, polystyrene, polyethylene terephthalate, ethylene vinyl alcohol, polyvinyl alcohol, polyvinylidene chloride, polyamides, polycarbonates, cellulosics, and combinations thereof. In addition, in some applications, two or more different types of thermoplastic materials are fed in to the inlet of the extrusion die to produce a multilayer sheet 18. The resulting multilayer film is composed of multiple individual layers stacked one on top of another and adhered together, with at least one individual layer having a different composition than at least one other individual layer in the film.

As mentioned above, extrusion die 12 includes fastener tension adjustment assembly 26 that is operable to adjust the tension on fasteners 24, which mechanically couple first lip body 22A to first die body portion 20A. Additional details about fastener tension adjustment assembly 26 are provided in connection with FIGS. 3-6. Although not well visible on FIG. 1, second die body portion 20B is also connected to second lip body 22B with a plurality of fasteners 28 positioned at spaced intervals along the length of extrusion die 12. A second tension adjustment assembly 30 is provided to adjust the tension on fasteners 28 and, correspondingly, the amount of force holding second lip body 22B to second die body portion 20B. Fasteners 28 and second tension adjustment assembly 30 can have the same configuration as fasteners 24 and fastener tension adjustment assembly 26. Accordingly, for sake of brevity, the foregoing discussion focuses on fasteners 24 and fastener tension adjustment assembly 26 with the understanding that fasteners 28 and second tension adjustment assembly 30 can have the same or similar configuration. Moreover, in other applications, extrusion die 12 does not include second tension adjustment assembly 30 but instead only has a single tension adjustment assembly attaching one lip body (e.g., first lip body 22A or second lip body 22B) to a corresponding die body portion (e.g., first die body portion 20A or second die body portion 20B).

Figure 2:
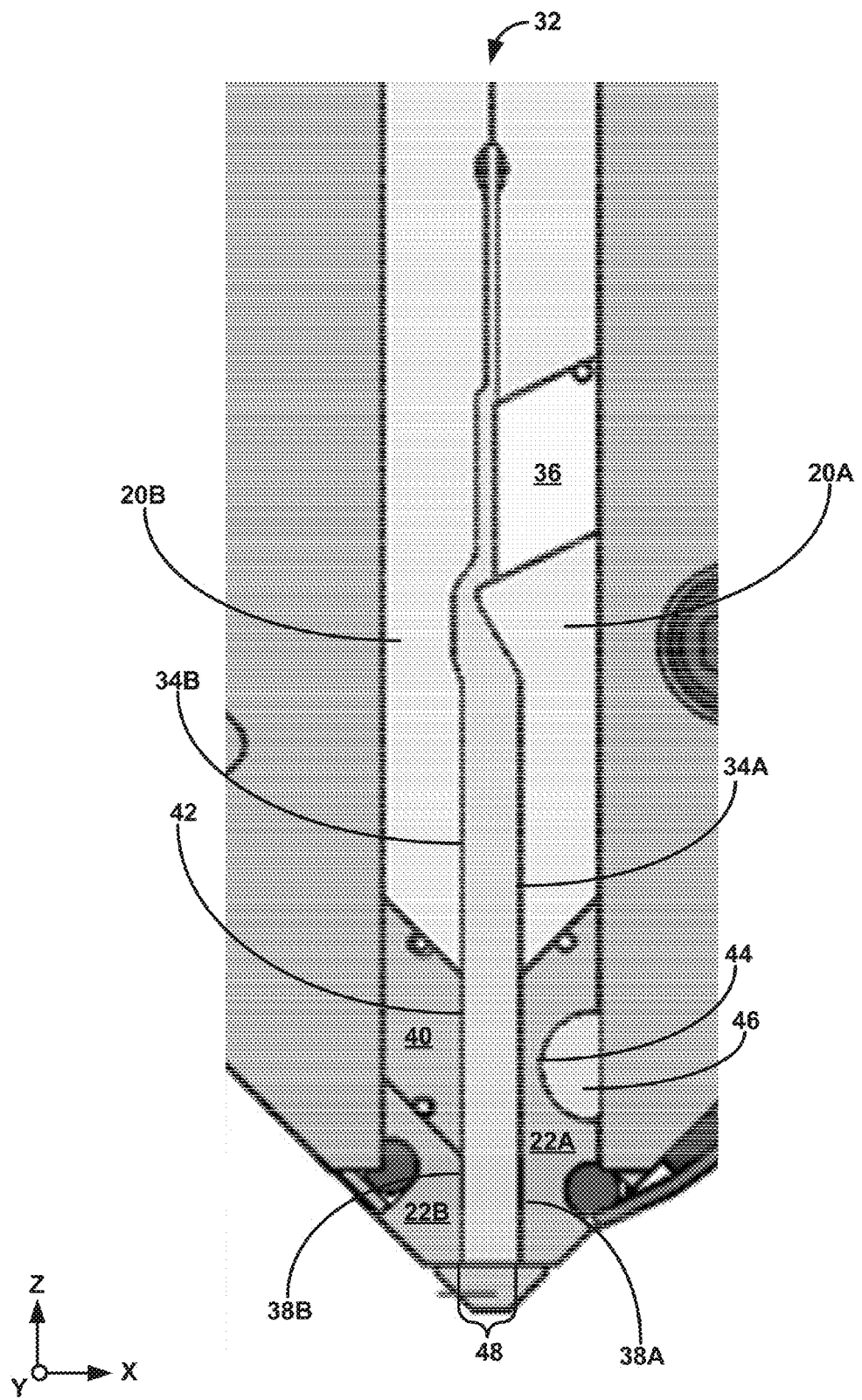
FIG. 2 is a side view drawing illustrating an example flow channel configuration for the extrusion die of FIG. 1.

FIG. 2 is a side view drawing illustrating an example flow channel configuration for extrusion die 12. As shown in the example, extrusion die 12 includes first die body portion 20A and second die body portion 20B (collectively forming a die body 20) having a flow channel 32 therebetween. First die body portion 20A has a first flow channel face 34A. Second die body portion 20B has a second flow channel face 34B. First flow channel face 34A and second flow channel face 34B are the surfaces of the die body portions facing flow channel 32 and bounding the flow channel. In operation, molten polymer flows through flow channel 32 adjacent to and in contact with first flow channel face 34A and second flow channel face 34B.

In different embodiments, first die body portion 20A and second die body portion 20B can form a coat hanger-type die manifold, a "T"-type die manifold, a fishtail die manifold, a variation of a coat hanger-type die manifold, or yet further die manifold design. Independent of the specific type of manifold formed by die body 20, flow channel 32 can be in fluid communication with, and extend to or through, the manifold. In the illustrated configuration of FIG. 2, die body 20 includes a restrictor or chocker bar 36 that can move into and out of flow channel 32 upstream of the land channel. This can adjust polymer flow through the die body upstream of the land channel. In other embodiments, extrusion die 12 does not include a restrictor bar.

Extrusion die 12 also includes first lip body 22A, second lip body 22B. First lip body 22A has a first lip face 38A. Second lip body 22B has a second lip face 38B. First lip face 38A and second lip face 38B provide surfaces downstream of first flow channel face 34A and second flow channel face 34B that face flow channel 32 and bound the flow channel. When polymer is flowing through flow channel 32, the polymer can flow adjacent to and in contact with first lip face 38A and second lip face 38B.

Additionally, extrusion die 12 is illustrated as having a land channel body 40 having a land channel face 42 positioned between second flow channel face 34B and second lip face 38B. In this configuration, land channel body 40 can move independently of second die body portion 20B and second lip body 22B, allowing the length of the land channel in extrusion die 12 to be adjusted. Such an example configuration is described in U.S. patent application Ser. No. 14/627,489, filed Feb. 20, 2015, the entire contents of which are incorporated herein by reference. In other configurations, extrusion die 12 does not have land channel body 40 or an adjustable land channel length, and the disclosure is not limited in this respect.

In FIG. 2, first lip body 22A is illustrated as being a flexible lip body while second lip body 22B is illustrated as having an inflexible lip body. The flexible lip body includes a hinge 44, which is defined in part by a recess 46. Hinge 44 allows movement of the flexible lip body relative to first die body portion 20A. A biasing member can push against the cantilevered end of the flexible lip body to cause the lip to flex at hinge 44 (while the upstream end of the lip body does not flex). In other configurations, second lip body 22B may also be configured as a flexible lip body or first lip body 22A may be configured as an inflexible lip body.

First lip body 22A and second lip body 22B form an outlet orifice 48 of flow channel 32 between the two bodies. Molten polymer is received at an inlet of flow channel 32, conveyed along the length of the flow channel (in the Z-direction indicated on FIG. 2) through the extrusion die, and discharged from the extrusion die via outlet orifice 48. Flow channel 32 is bounded on one side (in the X-direction indicated on FIG. 2) by first flow channel face 34A and first lip face 38A. Flow channel 32 is bounded on an opposite side by second flow channel face 34B, land channel face 42, and second lip face 38B. Flow channel 32 bounded in that the different surfaces delimit the cavity inside of extrusion die 12 forming the flow channel.

Figure 3A:
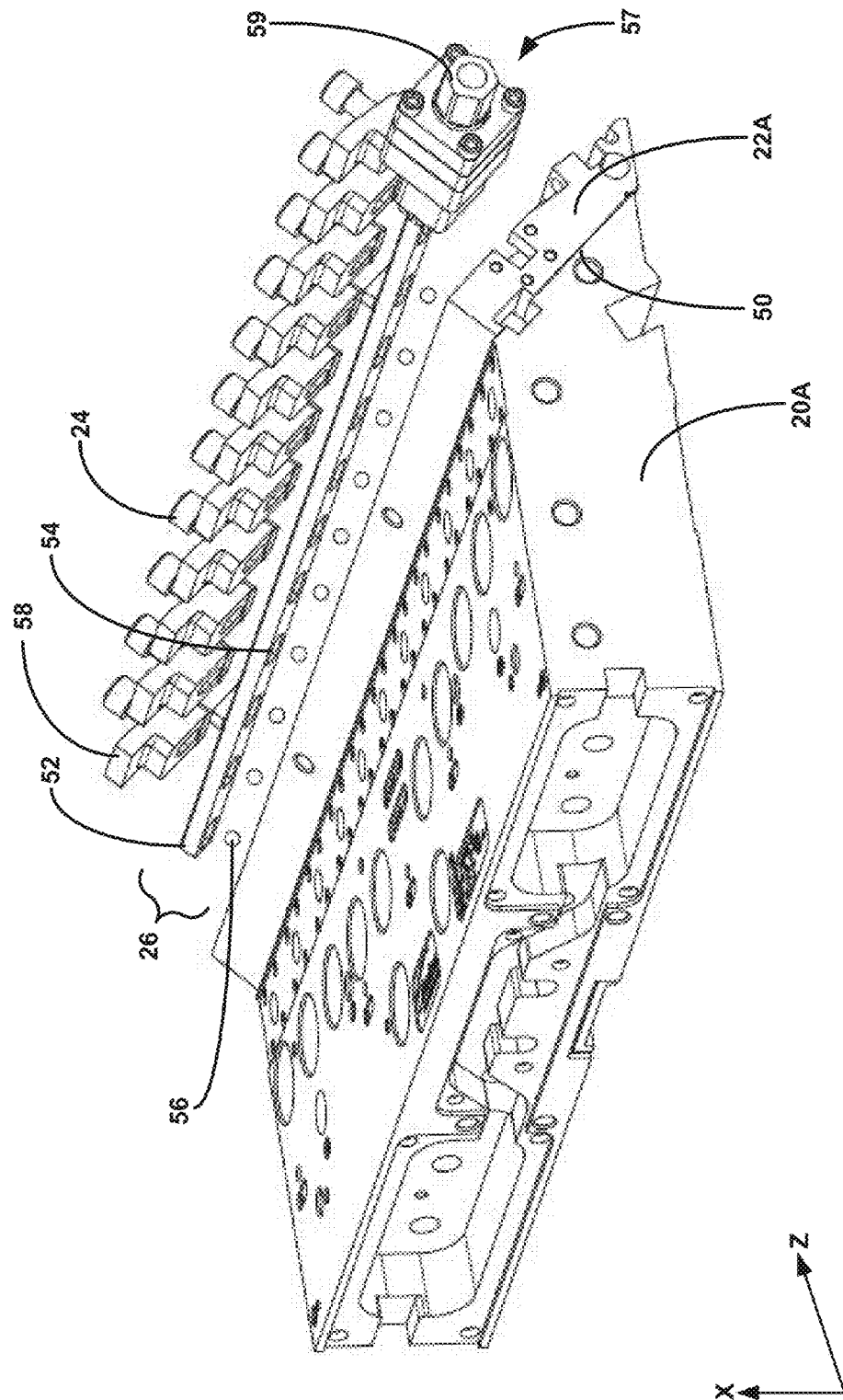
FIGS. 3A and 3B are exploded perspective front and back views, respectively, of an example configuration of the fastener tension adjustment assembly used in the system of FIG. 1.
Figure 3B:
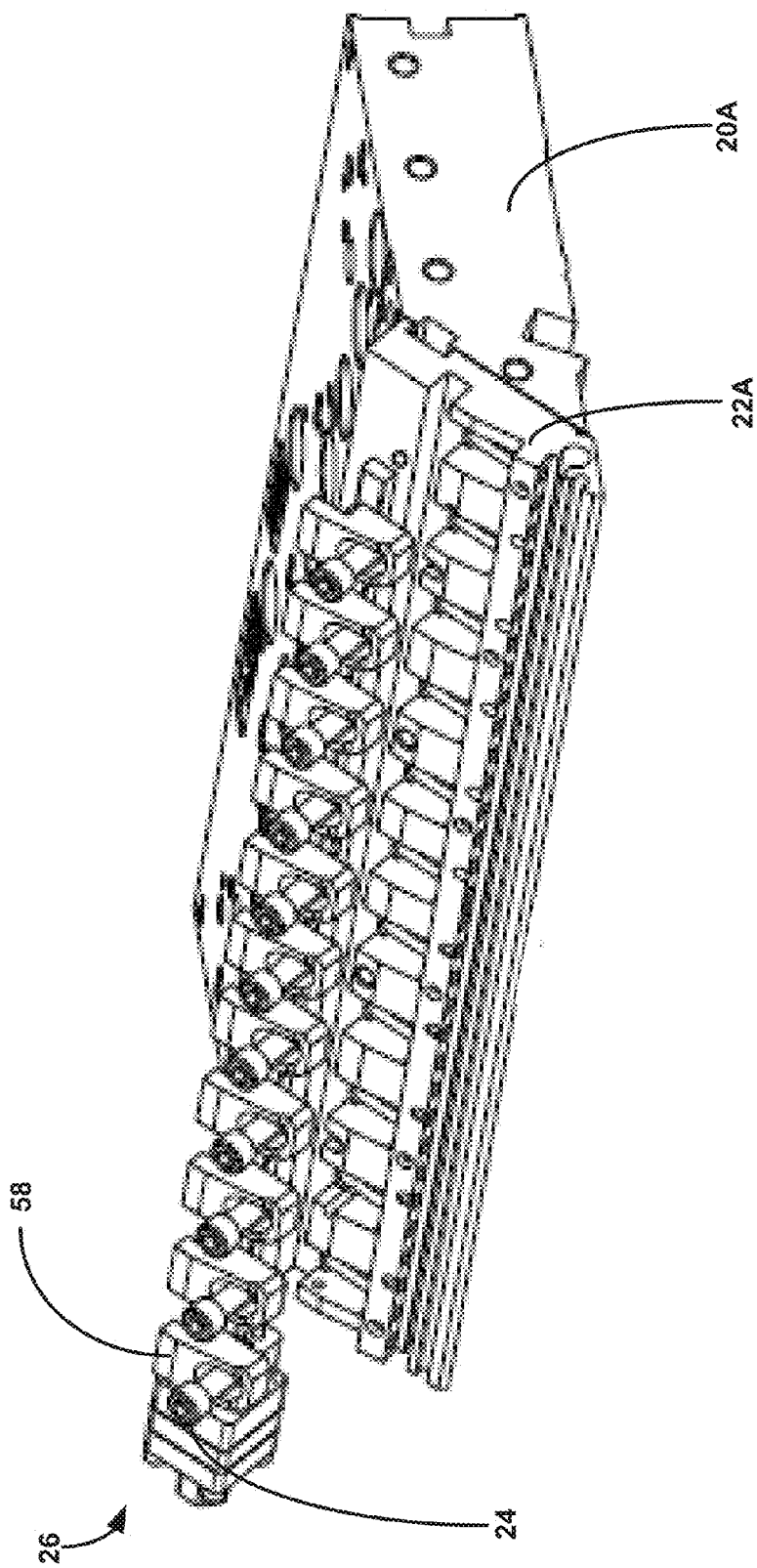

FIGS. 3A and 3B are exploded perspective front and back views, respectively, of an example configuration of fastener tension adjustment assembly 26 that is used in system 10 of FIG. 1. The different components of fastener tension adjustment assembly 26 are illustrated as being separated from but connectable to each other so as to provide adjustable tension control between first die body portion 20A and first lip body 22A. As shown in the illustrated example, first lip body 22A is positioned on a downstream face 50 (in the direction of polymer flow) of first die body portion 20A. In addition, first lip body 22A is shown as a physically separate structure from first die body portion 20A that can be removably connected to the die body portion using a plurality of fasteners 24.

In some configurations, first lip body 22A can be positioned and connected to first die body portion 20A at multiple different locations along the downstream face 50 of the die body portion. For example, first lip body 22A may be a movable lip body that slides along the downstream face 50 of first die body portion 20A (in the X-Z plane indicated on FIG. 3A) to adjust the width of outlet orifice 48 (FIG. 2). In such configurations, the fastener openings in first lip body 22A through which fasteners 24 are inserted can be channels parallel to face 50 that allow first lip body 22A to slide along the downstream face 50 of first die body portion 20A. Fasteners 24 can be inserted through the channels and into first die body portion 20A, allowing the fasteners to be loosened and the position of first lip body 22A readjusted without entirely removing the fasteners from the die body portion.

To control the amount of force holding first lip body 22A to first die body portion 20A, the extrusion die in FIGS. 3A and 3B includes fastener tension adjustment assembly 26. Fastener tension adjustment assembly 26 in the illustrated configuration includes an elongated body 52 having a plurality of grooves 54. Elongated body 52 extends along the length of first die body portion 20A and first lip body 22A (in the Y-direction indicated on FIG. 3A). Fastener tension adjustment assembly 26 also includes a plurality of cam members 56.

To assemble fastener tension adjustment assembly 26 according to the configuration illustrated in FIGS. 3A and 3B, cam members 56 are inserted into corresponding cam member receiving slots formed in the external face of first lip body 22A. Further, elongated body 52 is positioned adjacent to and/or in contact with first lip body 22A such that each cam member is inserted into a corresponding groove 54 of the elongated body. Upon inserting fasteners 24 through first lip body 22A and securing the distal end of the fasteners into first die body portion 20A in the illustrated example, elongated body 52 becomes operatively connected to each of the plurality of fasteners 24. Elongated body 52 can be operatively connected to fasteners 24 in that the elongated body is mechanically interconnected (directly or indirectly) to the fasteners, allowing force applied by or through elongated body 52 to be transmitted to the fasteners.

As described below in more detail, a force can be generated by elongated body 52 and applied to fasteners 24 by moving grooves 54 and cam members 56 relative to each other, causing elongated body 52 to bear against fasteners 24 with greater or lesser force depending on the relative position of the cam members within the grooves. For example, grooves 54 may be deeper on one end and shallower on the opposite end. As cam members 56 move from the deeper end to the shallower end of the groove in such a configuration, the cam members push elongated body 52 away from first lip body 22A, increasing the amount of force applied by the elongated body to fasteners 24. Conversely, as cam members 56 move from the shallower end to the deeper end of the groove, elongated body 52 moves towards first lip body 22A, decreasing the amount of force applied by the elongated body to fasteners 24.

Elongated body 52 can be implemented using any structure that extends across multiple fasteners 24 and physically and/or mechanically interconnects the fasteners (e.g., such that force applied by or through the elongated body is transmitted to the fasteners). Elongated body 52 can have a length (in the Y-direction indicated on FIG. 3A) greater than a width and/or height. In some configurations, elongated body 52 is operatively connected to all of fasteners 24 connecting first lip body 22A to first die body portion 20A. In other configurations, elongated body 52 is operatively connected to less than all of fasteners 24. In this latter configuration, elongated body 52 can be used to adjust the tension on a subset of fasteners 24 with the tension on the remaining fasteners being adjusted fastener-by-fastener and/or using a secondary fastener tension adjustment assembly.

In general, elongated body 52 forms a mechanical linkage between multiple of fasteners 24. In the illustrated configuration of FIGS. 3A and 3B, elongated body 52 takes the form of a slide bar that is configured to slide relative to first lip body 22A. The slide bar is illustrated as being straight and generally rectangular in shape but is not limited to such a configuration. In operation, the slide bar can slide along cam members 56 and/or first lip body 22A. For example, the slide bar can slide (e.g., translate linearly) laterally relative to the plurality of fasteners 24 (in the positive and negative Y-direction indicated on FIG. 3A). The amount of force applied by the slide bar on fasteners 24 varies depending on the lateral position of the bar relative to the fasteners.

In some configurations, elongated body 52 is in direct contact with each of the plurality of fasteners 24 such that the elongated body presses directly against the fasteners (e.g., heads of the fasteners). In other configurations, elongated body 52 contacts an intermediate structure positioned between the elongated body and the plurality of fasteners. In this latter configuration, elongated body 52 can press indirectly against the plurality of fasteners 24 by pressing against the intermediate structure which, in turn, transmits force from elongated body 52 to the fasteners.

For example, in the configuration of FIGS. 3A and 3B, fastener tension adjustment assembly 26 is illustrated as including a plurality of fastener engagement members 58. Each of the plurality of fastener engagement members 58 corresponds to one of the plurality of fasteners 24. Each fastener engagement member 58 has a hole through which a fastener 24 is inserted. Each fastener engagement member 58 can engage with a head or other enlarged cross-sectional region of a fastener. Further, each fastener engagement member 58 is in contact with elongated body 52. Accordingly, as elongated body 52 moves towards or away from first lip body 22A, the elongated body bears against the plurality of fastener engagement members 58 with lesser or greater force. In turn, this causes the amount of force pushing on fasteners 24 to decrease or increase.

To translate elongated body 52 and thereby move the elongated body towards or away from first lip body 22A, fastener tension adjustment assembly 26 includes an actuator 57. Actuator 57 is illustrated as a single-point actuator that is operable to translate elongated body 52 laterally (in the positive and negative Y-direction indicated on FIG. 3A). Actuator can be operated by rotating an actuator body 59, thereby forcing a rod coupled to elongated body 52 to move axially toward or away from the actuator body. As elongated body 52 translates axially toward or away from the actuator body 59, it also moves toward or away from first lip body 22A. Other actuator configurations can be used, as will be appreciated by those of ordinary skill in the art.

Figure 4A:
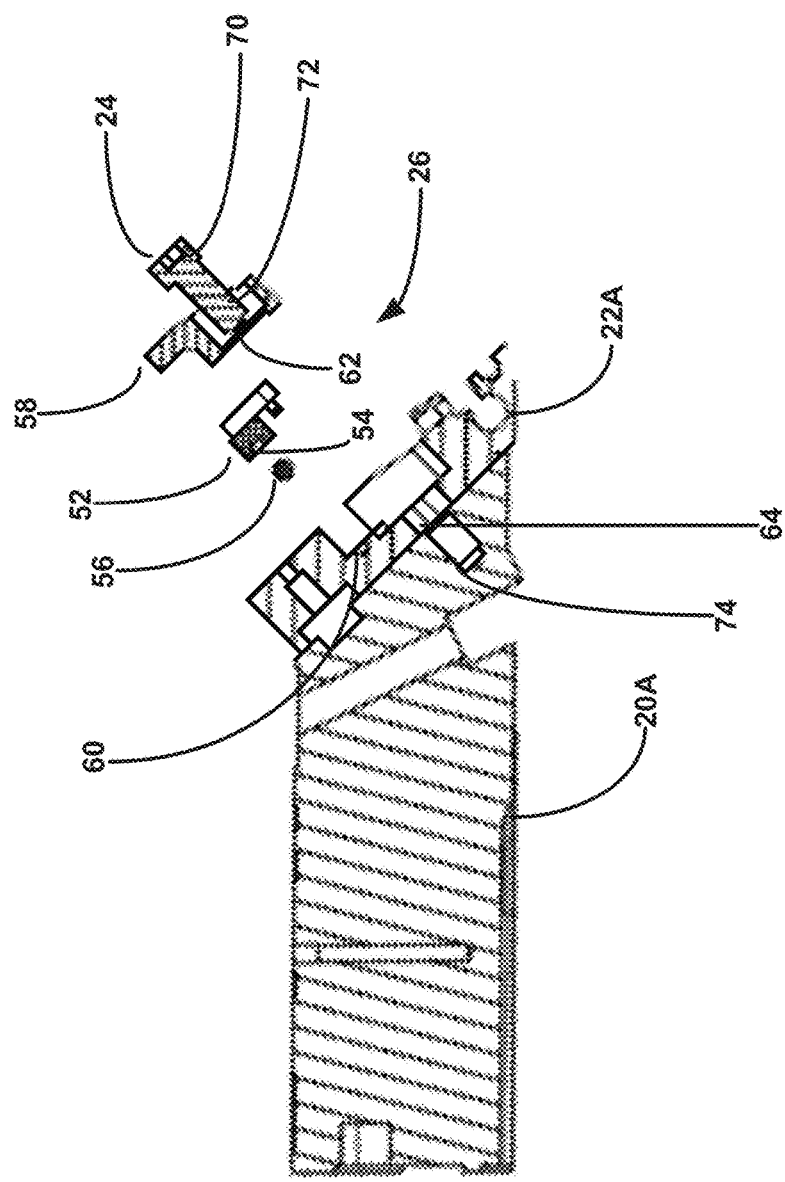
FIGS. 4A and 4B are side views of the fastener tension adjustment assembly from FIGS. 3A and 3B.
Figure 4B:
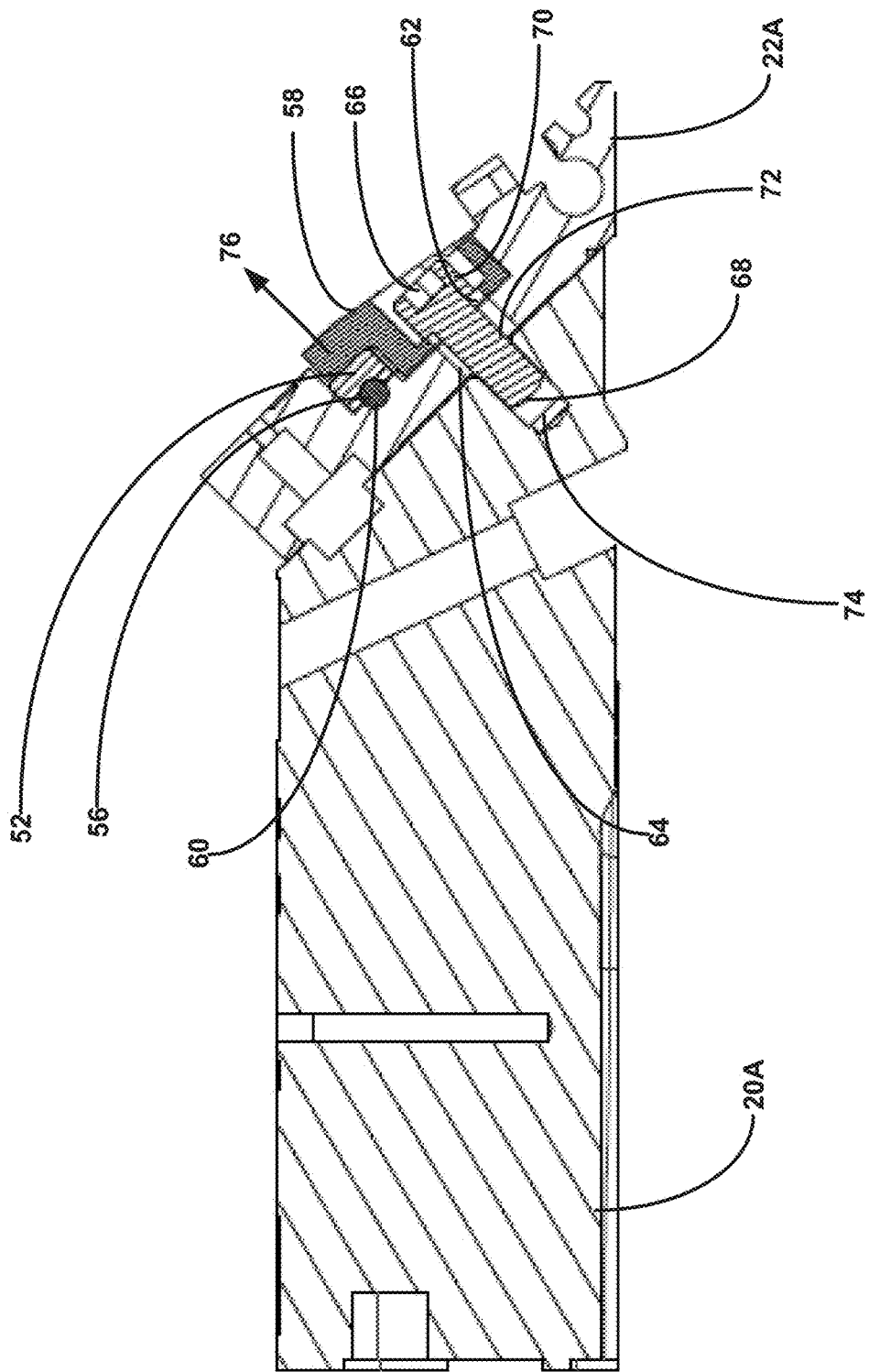

FIGS. 4A and 4B are side views of fastener tension adjustment assembly 26 from FIGS. 3A and 3B (taken from the X-Z plane of FIG. 3A). FIG. 4A illustrates fastener tension adjustment assembly 26 disassembled with fastener 24 removed from but insertable into first lip body 22A and first die body portion 20A. FIG. 4B illustrates fastener tension adjustment assembly 26 assembled with fastener 24 inserted through first lip body 22A and into first die body portion 20A. While FIGS. 4A and 4B illustrate a portion of fastener tension adjustment assembly 26 adjacent one particular fastener 24, it should be appreciated that fastener tension adjustment assembly 26 can have the same or similar configuration adjacent other fasteners connecting first lip body 22A to first die body portion 20A.

In the illustrated configuration, cam member 56 is inserted into a cam member receiving aperture 60 formed into the face of first lip body 22A. Elongated body 52 is installed over cam member 56 with the cam member received into groove 54 of the elongated body. In addition, fastener engagement member 58 is positioned over elongated body 52 to hold the elongated body adjacent to and/or in contact with first lip body 22A. Fastener 24 extends through a fastener hole 62 in fastener engagement member 58 and another fastener hole 64 in first lip body 22A to secure the fastener engagement member and lip body to first die body portion 20A.

In general, fastener 24 can be any component that mechanically fastens or connects first lip body 22A to first die body portion 20A. In different examples, fastener 24 can be a screw, bolt, rivet, pin, or other piece of hardware mechanically joining first lip body 22A and first die body portion 20A. In the example of FIGS. 4A and 4B, fastener 24 is illustrated as a bolt extending from a proximal end 66 to a distal end 68. The bolt has a head 70 at the proximal end and a shaft 72 at the distal end. The head 70 has an enlarged cross-sectional area compared to shaft 72. For example, head 70 may have a cross-sectional area larger than fastener hole 62 in fastener engagement member 58 and fastener hole 64 in first lip body 22A. Shaft 72 can be threaded such that it threading engages with a fastener opening 74 in first die body portion 20A.

To secure first lip body 22A to first die body portion 20A in the illustrated example, the distal end of fastener 24 formed by shaft 72 is inserted through fastener hole 62 in fastener engagement member 58 and fastener hole 64 in first lip body 22A. The distal end of fastener 24 is then advanced into fastener opening 74 in first die body portion 20A by turning the threaded shaft in the opening. As fastener 24 advances distally into fastener opening 74, the proximal end of the fastener formed by head 70 presses against fastener engagement member 58. The twisting force or torque applied to fastener 24 causes head 70 to bear against fastener engagement member 58 and, in turn, first lip body 22A with increasing force.

When elongated body 52 moves laterally (in the positive Y-direction indicated on FIG. 3A), fastener tension adjustment assembly 26 moves towards or away from first lip body 22A. For example, grooves 54 on elongated body 52 may be deeper on one end and shallower on the opposite end. As elongated body 52 moves in one lateral direction (e.g., the positive Y-direction indicated on FIG. 3), cam member 56 moves from the deeper end to the shallower end of the groove. This causes cam member 56 of fastener tension adjustment assembly 26 to push elongated body 52 away from first lip body 22A. In turn, elongated body 52 presses against fastener engagement member 58, which further pushes against head 70 of fastener 24. The direction of the force applied by cam member 56 and elongated body 52 to fastener 24 is generally orthogonal to the lateral direction elongated body 52 slides (as indicated by arrow 76 in FIG. 4B). Moving elongated body 52 laterally in the opposite direction (in the negative Y-direction indicated on FIG. 3A), fastener tension adjustment assembly 26 moves towards first lip body 22A. As elongated body 52 moves, cam member 56 moves from the shallower end to the deeper end of groove 54. This allows elongated body 52 to move closer to first lip body 22A, reducing the amount of force applied by fastener tension adjustment assembly 26 on fastener engagement member 58 and, in turn, head 70 of fastener 24.

Figure 5A:
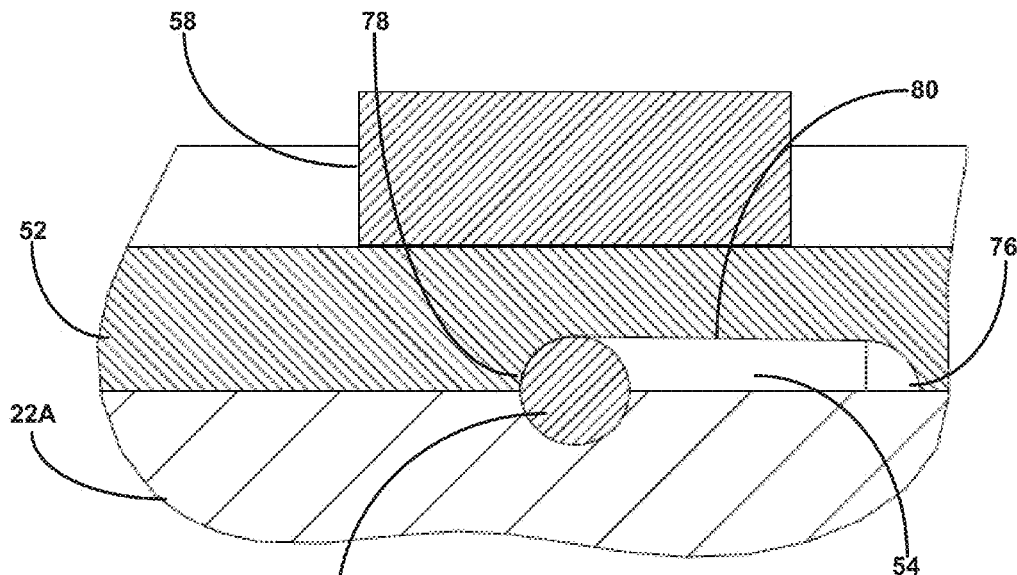
FIGS. 5A and 5B are cross-sectional views showing an example configuration of a groove on the fastener tension adjustment assembly.
Figure 5B:
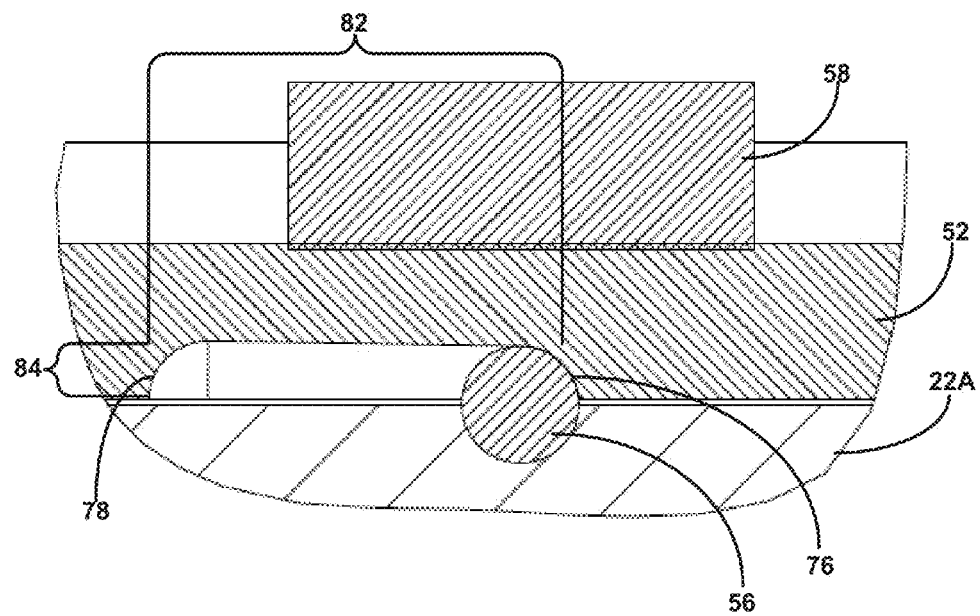

FIGS. 5A and 5B are cross-sectional views of elongated body 52 showing an example configuration of groove 54. As shown in FIGS. 5A and 5B, groove 54 has a first end 76, a second end 78, and a bottom surface 80. Groove 54 has a length 82 and a depth 84. The second end 78 of groove 54 is deeper (extends farther into elongated body 52) than the first end 76 of the groove. Accordingly, the bottom surface 80 of groove 54 is angled from the first end 76 to the second end 78.

FIG. 5A illustrates elongated body 52 moved to a first lateral position (e.g., in the positive Y-direction indicated on FIG. 3) with cam member 56 positioned in the second end 78 of groove 54. Since groove 54 is deeper at second end 78, elongated body 52 is moved towards first lip body 22A and, in the illustrated example, is in contact with first lip body 22A.

FIG. 5B illustrates elongated body 52 moved to a second lateral position (e.g., in the negative Y-direction indicated on FIG. 3) with cam member 56 positioned in the first end 76 of groove 54. Since groove 54 is shallower at first end 76, elongated body 52 is moved away from first lip body 22A and, in the illustrated example, creates a small gap between the elongated body and first lip body 22A.

In some configurations, the bottom surface 80 of groove 54 has a constant slope such that there is a continuous angle or taper from the first end 76 to the second end 78. In these configurations, the amount of force applied by fastener tension adjustment assembly 26 progressively and continuously increases as cam member 56 translates in one direction within groove 54 and progressively and continuously decreases as cam member 56 translates in the opposite direction. In other configurations, the bottom surface 80 of groove 54 has a discontinuously variable depth across its length 82. For example, the bottom surface 80 of groove 54 can have multiple shallow regions interspaced by regions of deeper depth. The regions of shallower depth can each have a different depth, providing discrete positions into which cam member 56 is moved during operation.

Independent of the specific configuration of groove 54, the groove translates relative to cam member 56 to move fastener tension adjustment assembly 26 toward and away from first lip body 22A in the FIGS. 5A and 5B. That is, due to the inclined (or "ramped") configuration of groove 54, the resulting camming and/or rolling action of cam member 56 moves elongated body 52 towards and away from first lip body 22A. In this configuration, cam member 56 does not move relative to first lip body 22A. Rather, cam member 56 remains stationary while elongated body 52 translates laterally relative to the cam member, causing the elongated body to also move relative to first lip body 22A (e.g., into and out of contact with first lip body 22A). Therefore, while fastener tension adjustment assembly 26 is described as being configured to move toward and away from first lip body 22A, it should be appreciated that the entire assembly need not move relative to the lip body. Instead, one or more components of fastener tension adjustment assembly 26 can move toward and away from first lip body 22A while one or other components of the assembly remain stationary.

Fastener tension adjustment assembly 26 is illustrated in FIGS. 4A-4B and 5A-5B as having cam member 56 positioned between elongated body 52 and first lip body 22A. In an alternative configuration, cam member 56 can be positioned between elongated body 52 and fastener engagement member 58 such that groove 54 opens outwardly toward the fastener engagement member. In this configuration, cam member 56 moves towards and away from first lip body 22A (by translating along the inclined bottom surface 80 of groove 54) while elongated body 52 translates laterally relative to the cam member. Elongated body does not move towards and away from first lip body 22A in such a configuration. Thus, when used, cam member 56 can be located between elongated body 52 and first lip body 22A and/or between elongated body 52 and fastener engagement member 58.

In general, cam member 56 is any member that provides a camming action with elongated body 52, e.g., converting rotary motion into linear motion. In the illustrated example, cam member 56 is a sphere, such as a ball bearing that is received in groove 54. The bottom surface of groove 54 defines an elongated, inclined track that rides on the sphere received in that groove during relative movement of elongated body 52 and cam member 56. As an alternative, cam member 56 can be a cylinder (e.g., pin) against which elongated body 52 cams (and/or rolls) during relative movement. In yet other examples, fastener tension adjustment assembly 26 does not include cam members 56. Rather, in these configurations, camming action can be provided by oppositely tapered wedge surfaces on first lip body 22A and elongated body 52.

In addition, while cam member 56 is illustrated as being physically separate from and insertable into elongated body 52 and first lip body 22A, it should be appreciated that cam member 56 need not have such a configuration. Instead, cam member 56 can be permanently formed in first lip body 22A and/or elongated body 52 (e.g., as a bump or protrusion extending outwardly from such structure) with a groove formed in the corresponding structure.

Figure 6:
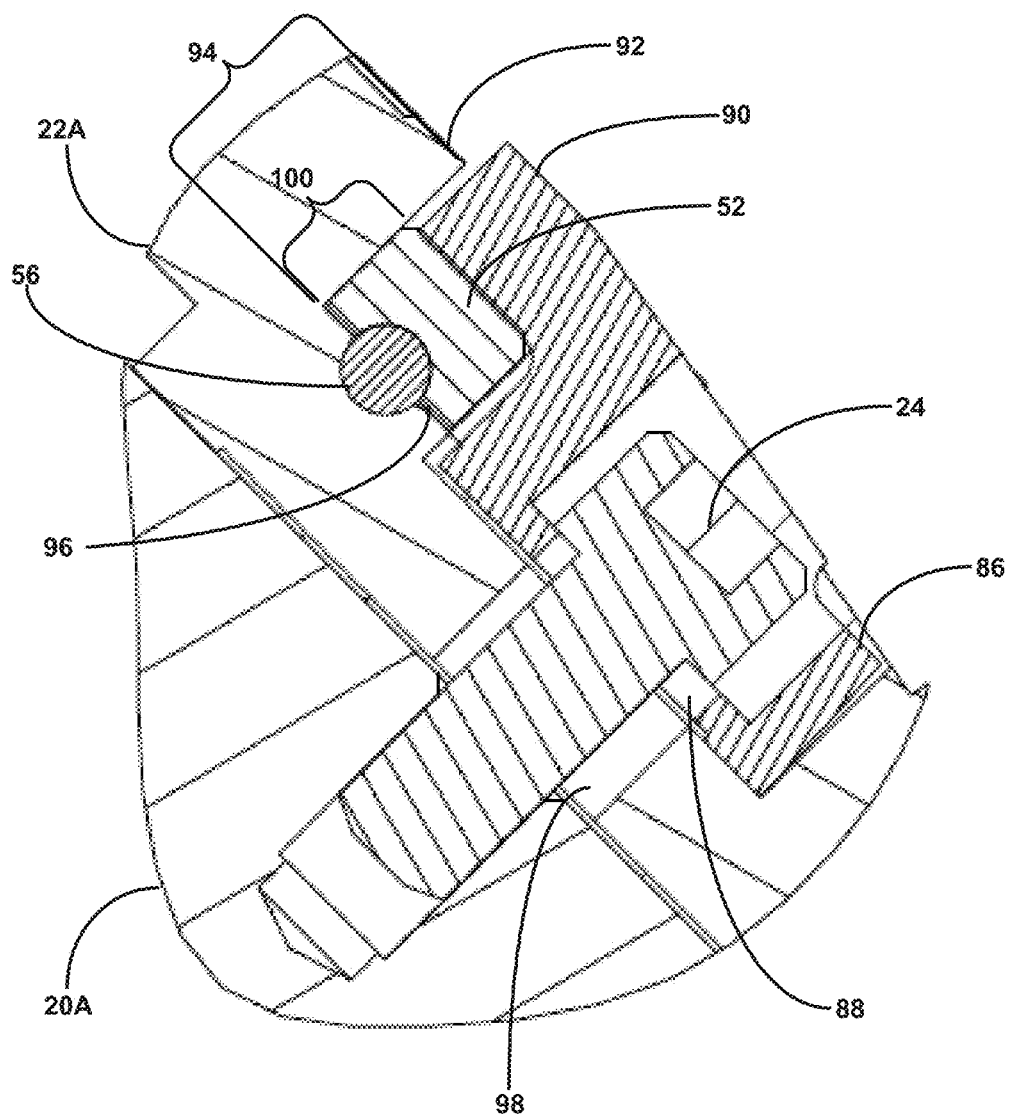
FIG. 6 is an exploded view of a portion of the fastener tension adjustment assembly from FIG. 4A.

To retain cam member 56 in groove 54 of elongated body 52, fastener tension adjustment assembly 26 can include fastener engagement member 58. FIG. 6 is an exploded view of a portion of fastener tension adjustment assembly 26 from FIG. 4A showing a configuration of fastener engagement member 58. In the illustrated configuration, fastener tension engagement member 58 has a body 86 having a fastener hole 88 extending therethrough and a cantilevered arm 90. In addition, first lip body 22A has an external face 92 forming a recessed channel 94. The recessed channel has a bottom surface 96 with a fastener opening 98 extending therethrough. The cantilevered arm 90 of fastener engagement member 58 extends over a portion of recessed channel 94 to form a pocket 100 between the bottom surface 96 of the channel and the cantilevered arm. Elongated body 52 is positioned in pocket 100 and is in contact with a bottom surface of cantilevered arm 90.

As elongated body 52 cams with cam member 56 to move the elongated body away from first lip body 22A, the top surface of the elongated body presses against the bottom surface of the cantilevered arm 90 with increasing force. The force is transmitted through fastener engagement member 58 to fastener 24 and tends to draw the fastener out of the hole into which it is inserted. This increases the tension and/or torque on the fastener by applying a biasing force stretching fastener 24 along its axial length. When elongated body 52 cams with cam member 56 to move the elongated body toward first lip body 22A, the top surface of the elongated body presses against the bottom surface of the cantilevered arm 90 with decreasing force. As a result, the amount of force transmitted through fastener engagement member 58 and applied to fastener 24 is decreased. This decreases the tension and/or torque on the fastener by reducing the biasing force stretching fastener 24 along its axial length. In alternatively configurations, fastener tension adjustment assembly 26 applied force directly to fastener 24 (e.g., a head of the fastener) without utilizing fastener engagement member 58.

The amount of force applied by fastener tension adjustment assembly 26 can be adjusted by adjusting the configuration of groove 54 and/or cam member 56. For example, the amount of force applied by fastener tension adjustment assembly 26 when cam member 56 is at the shallowest location in groove 54 can be increased by decreasing the depth of the groove at that location and/or increasing the size of cam member. Similarly, the amount of force applied by fastener tension adjustment assembly 26 when cam member 56 is at the deepest location in groove 54 can be decreased by increasing the depth of the groove at that location and/or decreasing the size of cam member 56. In one configuration, fastener tension adjustment assembly 26 is configured to increase the amount of torque on each of the plurality of fasteners by at least 50 foot-pounds when the assembly is actuated from a disengaged position in which cam member 56 is at the shallowest location in groove 54 to an engaged position in which cam member 56 is at the deepest location in groove 54. Such a configuration can be achieved by having the depth of groove 54 increase by 0.002" over a length of 1.25", which can adjust the torque on fasteners 24 from 30 foot-pounds when the assembly is in a disengaged position and cam member 56 is at the shallowest location of the groove to 90 foot-pounds when the assembly is in an engaged position and the cam member is at the deepest location in the groove.

To use fastener tension adjustment assembly 26, an operator may initially insert each of the plurality of fasteners 24 through corresponding fastener holes 62, 64 in fastener engagement member 58 and first lip body 22A, advancing the distal ends of the fasteners into corresponding fastener openings 74 in first die body portion 74. The operator can tighten each fastener individually to a threshold amount of torque. The threshold amount of torque can be the same for each of the plurality of fasteners or may be different for different fasteners. In some applications, the threshold amount of torque is at least 10 foot-pounds, such as at least 25 foot-pounds.

Subsequently, the operator can engage fastener tension adjustment assembly 26 to simultaneously increase the amount of force (e.g., torque) applied by each of the plurality of fasteners holding first lip body 22A to first die body portion 20A. The operator can actuate fastener tension adjustment assembly 26, causing elongated body 52 to slide laterally (e.g., transversely) and parallel to first lip body 22A. As elongated body 52 slides parallel to first lip body 22A, cam members 56 translate within corresponding grooves 54, forcing elongated body 52 orthogonally away from the bottom surface 96 of the lip body. In other words, elongated body 52 moves bi-directionally, both parallel to and away from first lip body 22A. As elongated body 52 moves orthogonally away from first lip body 22A, the elongated body pushes against fastener engagement members 58 (or, in other configurations, directly against fasteners 24), pushing the fasteners axially outward from the holes in which they inserted. This increases the amount of torque/force on the fasteners.

Because fastener tension adjustment assembly 26 is operatively connected to a plurality of fasteners 24, a single adjustment on the assembly to actuate the assembly can simultaneously adjust the amount of force applied to all fasteners. For example, actuating fastener tension adjustment assembly 26 can adjust the amount of force applied to each of the plurality of fasteners 24 at the same time and/or at the same rate.

While fastener tension adjustment assembly 26 can adjust the force applied to each of the plurality of fastener 24 by the same amount, the assembly is not limited to such a configuration. The amount of force applied to any one fastener can be controlled by controlling the configuration (e.g., size, depth) of the groove 54 and cam member 56 associated with each particular fastener. Thus, in some applications, fastener tension adjustment assembly 26 is used to simultaneously adjust the amount of force applied to each of the plurality of fasteners, with the amount of force being applied (by assembly 26) to one fastener being different than the amount of force applied to at least one other fastener.

In subsequent operation, extrusion die 12 can be operated while the plurality of fasteners 24 are held under an elevated amount of force provided by fastener tension adjustment assembly 26. For example, after actuating fastener tension adjustment assembly 26 to cause the plurality of cam members 56 to translate to the shallowest location in their corresponding grooves 54, the cam members can be held in that position while molten polymer is run through extrusion die 12 to produce sheet 18 (FIG. 1).

Periodically, the operator may actuate fastener tension adjustment assembly 26 to cause the plurality of cam members 56 to translate to the deepest location in their corresponding grooves 54. This reduces or eliminates any force applied on the plurality of fasteners 24 by the assembly. For example, the operator may actuate fastener tension adjustment assembly 26 to simultaneously reduce the amount of force applied on each of the plurality of fasteners 24. Once the force is reduced, the operator may move first lip body 22A relative to first die body portion 20A (when configured to be movable) to adjust the width of outlet orifice 48, as described with respect to FIG. 2. The operator can move first lip body 22A relative to first die body portion 20A without removing the plurality of fasteners 24 from either of the structures. Subsequently, the operator can again actuate tension adjustment assembly 26 to cause the plurality of cam members 56 to translate to their shallowest location, increasing the force applied on the fasteners for resuming extrusion operation.

Although fastener tension adjustment assembly 26 has been described herein as being suitable for adjusting an amount of force, or tension, applied on a plurality of fasteners holding a lip body to a die body portion, such an assembly can be used in other applications both within extrusion dies and outside of the extrusion die industry. As one alternative, fastener tension adjustment assembly 26 can be used to adjust the amount of tension applied on the body bolts holding a first body die portion to a second body die portion. Fastener tension adjustment assembly 26 can be operatively connected to each of a plurality of bolts connecting the first die body portion to the second die body portion and used to simultaneously adjust an amount of force applied to each of said plurality of fasteners.

Various examples have been described. These and other examples are within the scope of the following claims.

The invention claimed is:

1. An extrusion die, comprising:
   a die body,
   a lip body,
   a plurality of fasteners,
   a fastener tension adjustment assembly comprising an elongated body operatively connected to each of said plurality of fasteners, and
   a flow channel terminating in an outlet orifice,
   said die body including a first die body portion and a second die body portion forming the flow channel therebetween;
   said lip body being connected to one of said first die body portion and said second die body portion by said plurality of fasteners and forming one side of the outlet orifice;
   said fastener tension adjustment assembly being movable towards or away from said lip body, thereby simultaneously adjusting an amount of force applied to each of said plurality of fasteners, and
   said elongated body comprising a slide bar that applies a force to each of said plurality of fasteners, said slide bar being configured to slide in a lateral direction relative to said plurality of fasteners while moving towards or away from said lip body, and the force applied by said slide bar to each of said plurality of fasteners is applied in an orthogonal direction to the lateral direction.

2. The extrusion die of claim 1, wherein said slide bar is configured to slide from a first lateral position to a second lateral position, the force applied by said slide bar to each of said plurality of fasteners progressively increases as said slide bar slides from the first lateral position to the second lateral position and progressively decreases as said slide bar slides from the second lateral position to the first lateral position.

3. The extrusion die of claim 1, wherein each of said plurality of fasteners has a head and a shaft, and said elongated body bears against said head of each of said plurality of fasteners.

4. The extrusion die of claim 1, wherein each of said plurality of fasteners comprises a bolt having a head and a shaft, said shaft extends through said lip body and into said one of said first die body portion and said second die body portion to which said lip body is connected.

5. The extrusion die of claim 4, further comprising a plurality of fastener engagement members, each of said plurality of fastener engagement members being positioned between said head of said bolt and said lip body, wherein said fastener tension adjustment assembly presses against said plurality of fastener engagement members.

6. The extrusion die of claim 5, wherein each of said plurality of fastener engagement members comprises a body having a fastener hole extending therethrough and a cantilevered arm, and said fastener tension adjustment assembly presses against said cantilevered arm with increasing force as said fastener tension adjustment assembly moves away from said lip body and decreasing force as said fastener tension adjustment assembly moves toward said lip body.

7. The extrusion die of claim 6, wherein said lip body has an external face having a recessed channel with a bottom surface having a plurality of fastener openings therethrough, said cantilevered arm extends over a portion of said recessed channel to form a pocket between said bottom surface and said cantilevered arm, and said elongated body is positioned in said pocket.

8. The extrusion die of claim 1, wherein said fastener tension adjustment assembly further comprises an actuator configured to move said fastener tension adjustment assembly towards or away from said lip body.

9. The extrusion die of claim 8, wherein:
said fastener tension adjustment assembly further comprises a plurality of spheres located between said lip body and said elongated body,
said elongated body has a corresponding plurality of grooves in which said plurality of spheres are positioned,
each of said corresponding plurality of grooves has a length and a depth, said depth decreasing across said length, and
said fastener tension adjustment assembly is configured to move said elongated body relative to said lip body, thereby causing said plurality of spheres to slide in said corresponding plurality of grooves.

10. The extrusion die of claim 1, wherein said lip body is a first lip body connected to said first die body portion, and further comprising a second lip body connected to said second die body portion, said second lip body forming an opposite side of the outlet orifice from said first lip body.

11. The extrusion die of claim 10, wherein said outlet orifice has a width, and said first lip body is configured to move to adjust the width.

12. The extrusion die of claim 5, wherein said fastener tension adjustment assembly further comprises a plurality of cam members located between one of said elongated body and said lip body and said elongated body and said plurality of fastener engagement members.

13. The extrusion die of claim 12, wherein of said plurality of cam members comprises a sphere, said elongated body comprises angled surfaces, and each angled surface rides on a corresponding one of said plurality of cam members as said fastener tension adjustment assembly moves toward or away from said lip body.

14. The extrusion die of claim 13, wherein said elongated body comprises a plurality of grooves, each of said grooves has a first end and a second end, said second end of each groove being deeper than said first end, such that said angled surfaces are bottoms of said grooves, each of said plurality of cam members being received in a respective one of said plurality of grooves.

15. An extrusion die, comprising:
a die body,
a lip body,
a plurality of fasteners,
a fastener tension adjustment assembly comprising an elongated body operatively connected to each of said plurality of fasteners,
a plurality of fastener engagement members, and
a flow channel terminating in an outlet orifice,
said die body including a first die body portion and a second die body portion forming the flow channel therebetween;
said lip body being connected to one of said first die body portion and said second die body portion by said plurality of fasteners and forming one side of the outlet orifice; and
said fastener tension adjustment assembly being movable towards or away from said lip body, thereby simultaneously adjusting an amount of force applied to each of said plurality of fasteners;

each of said plurality of fasteners comprising a bolt having a head and a shaft, said shaft extending through said lip body and into said one of said first die body portion and said second die body portion to which said lip body is connected;
each of said plurality of fastener engagement members being positioned between said head of said bolt and said lip body, and comprising a body having a fastener hole extending therethrough and a cantilevered arm; and
said fastener tension adjustment assembly pressing against said cantilevered arm with increasing force as said fastener tension adjustment assembly moves away from said lip body and decreasing force as said fastener tension adjustment assembly moves toward said lip body.

16. The extrusion die of claim 15, wherein said lip body has an external face having a recessed channel with a bottom surface having a plurality of fastener openings therethrough, said cantilevered arm extends over a portion of said recessed channel to form a pocket between said bottom surface and said cantilevered arm, and said elongated body is positioned in said pocket.

17. The extrusion die of claim 15, wherein said fastener tension adjustment assembly further comprises a plurality of cam members located between one of said elongated body and said lip body and said elongated body and said plurality of fastener engagement members.

18. The extrusion die of claim 17, wherein each of said plurality of cam members comprises a sphere, said elongated body comprises angled surfaces, and each angled surface rides on a corresponding one of said plurality of cam members as said fastener tension adjustment assembly moves toward or away from said lip body.

19. The extrusion die of claim 18, wherein said elongated body comprises a plurality of grooves, each of said grooves has a first end and a second end, said second end of each groove being deeper than said first end, such that said angled surfaces are bottoms of said grooves, each of said plurality of cam members being received in a respective one of said plurality of grooves.

20. An extrusion die, comprising:
a die body,
a lip body,
a plurality of fasteners,
a fastener tension adjustment assembly, and
a flow channel terminating in an outlet orifice;
said die body including a first die body portion and a second die body portion forming the flow channel therebetween;
said lip body being connected to one of said first die body portion and said second die body portion by said plurality of fasteners and forming one side of the outlet orifice;
said fastener tension adjustment assembly comprising:
an elongated body operatively connected to each of said plurality of fasteners, said elongated body having a plurality of grooves;
an actuator configured to move said fastener tension adjustment assembly towards or away from said lip body, thereby simultaneously adjusting an amount of force applied to each of said plurality of fasteners; and
a plurality of spheres located between said lip body and said elongated body;
said plurality of spheres are positioned within said plurality of grooves of said elongated body, each of said plurality of grooves has a length and a depth, said depth decreasing across said length; and said fastener tension adjustment assembly is configured to move said elongated body relative to said lip body, thereby causing said plurality of spheres to slide in said corresponding plurality of grooves.

21. The extrusion die of claim 20, wherein each of said plurality of fasteners comprises a bolt having a head and a shaft, said shaft extends through said lip body and into said one of said first die body portion and said second die body portion to which said lip body is connected.

22. The extrusion die of claim 21, further comprising a plurality of fastener engagement members, each of said plurality of fastener engagement members being positioned between said head of said bolt and said lip body, wherein said fastener tension adjustment assembly presses against said plurality of fastener engagement members.

23. The extrusion die of claim 22, wherein each of said plurality of fastener engagement members comprises a body having a fastener hole extending therethrough and a cantilevered arm, and said fastener tension adjustment assembly presses against said cantilevered arm with increasing force as said fastener tension adjustment assembly moves away from said lip body and decreasing force as said fastener tension adjustment assembly moves toward said lip body.

24. The extrusion die of claim 23, wherein said lip body has an external face having a recessed channel with a bottom surface having a plurality of fastener openings therethrough, said cantilevered arm extends over a portion of said recessed channel to form a pocket between said bottom surface and said cantilevered arm, and said elongated body is positioned in said pocket.

* * * * *